(12) United States Patent     (10) Patent No.:   US 12,625,656 B2

Helbert     (45) Date of Patent:     May 12, 2026

---

(54) MODULAR STRAP FOR ELECTRONIC DEVICE

(71) Applicant: Apple Inc., Cupertino, CA (US)

(72) Inventor: Kendall L. Helbert, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/598,826

(22) Filed: Mar. 7, 2024

(65) Prior Publication Data

US 2024/0211195 A1     Jun. 27, 2024

Related U.S. Application Data

(63) Continuation of application No. PCT/US2022/076682, filed on Sep. 19, 2022.

(60) Provisional application No. 63/261,509, filed on Sep. 22, 2021.

(51) Int. Cl.

| | |
|---|---|
| *G06F 3/14* | (2006.01) |
| *G06F 1/16* | (2006.01) |
| *G06F 1/3218* | (2019.01) |
| *G06F 1/3231* | (2019.01) |
| *G06K 19/06* | (2006.01) |

(52) U.S. Cl.

CPC ................ *G06F 3/14* (2013.01); *G06F 1/163* (2013.01); *G06F 1/3218* (2013.01); *G06F 1/3231* (2013.01); *G06K 19/06028* (2013.01); *G06K 19/06037* (2013.01)

(58) Field of Classification Search

CPC ........ G02B 2027/0178; G02B 27/0176; G06F 1/163; G06F 1/1698; G06F 1/3218; G06F 1/3231; G06F 1/3265; G06F 3/14

See application file for complete search history.

(56) References Cited

U.S. PATENT DOCUMENTS

| | | | | |
|---|---|---|---|---|
| 11,394,215 | B1* | 7/2022 | Bhagwan .............. | H02J 7/0063 |
| 2016/0005233 | A1* | 1/2016 | Fraccaroli ............ | G06F 3/0487 |
| | | | | 345/633 |
| 2016/0212538 | A1* | 7/2016 | Fullam ...................... | H04S 7/40 |
| 2016/0324470 | A1* | 11/2016 | Townsend ............. | G06F 1/1679 |
| 2018/0046147 | A1 | 2/2018 | Aghara et al. | |
| 2018/0070840 | A1* | 3/2018 | Cronin ................. | A61B 5/7435 |
| 2018/0197500 | A1* | 7/2018 | Patel ....................... | G06F 3/147 |
| 2019/0041644 | A1* | 2/2019 | Abele ................ | G02B 27/0172 |
| 2019/0171023 | A1* | 6/2019 | Carlvik ............. | G02B 27/0176 |
| 2021/0306956 | A1* | 9/2021 | Jones, III .......... | H04W 52/0261 |
| 2022/0174764 | A1* | 6/2022 | Huang .............. | G02B 27/0172 |

(Continued)

FOREIGN PATENT DOCUMENTS

EP     3432052 A2     1/2019

OTHER PUBLICATIONS

Partial International Search Report for International Application No. PCT/US2022/076682, mailed Jan. 13, 2023 (11 pp.).

*Primary Examiner* — Hong Zhou

(74) *Attorney, Agent, or Firm* — Dorsey & Whitney LLP

(57) ABSTRACT

An electronic device includes a display portion and a modular securement assembly. The modular securement assembly is connectable to the display portion and includes a removable strap. The removable strap can include a communication module. The display portion can also include a sensor and the removable strap can also include an identifier. The sensor can sense the identifier.

19 Claims, 6 Drawing Sheets

(56)                         References Cited

U.S. PATENT DOCUMENTS

| | | | |
|---|---|---|---|
| 2022/0182760 A1* | 6/2022 | Hanley | ................. H04L 65/403 |
| 2022/0400173 A1* | 12/2022 | Gangwal | ................ A45C 15/00 |

* cited by examiner

MODULAR STRAP FOR ELECTRONIC DEVICE

CROSS-REFERENCE TO RELATED APPLICATION(S)

This application is a continuation of International Application No. PCT/US2022/076682, filed 19 Sep. 2022, and entitled "MODULAR STRAP FOR ELECTRONIC DEVICE," which claims priority to U.S. Provisional Patent Application No. 63/261,509, filed 22 Sep. 2021, and entitled "MODULAR STRAP FOR ELECTRONIC DEVICE," the entire disclosures of which are hereby incorporated by reference.

FIELD

The described embodiments relate generally to wearable electronic devices. More particularly, the present embodiments relate to modular wearable electronic devices and associated components.

BACKGROUND

Wearable electronic devices, including head mounted displays, can have a variety of different uses, from entertainment to industrial applications. Additionally, wearable electronic devices can provide users with multimedia experiences that include both visual and audio content. Additionally, a user may desire different settings or options associated with these devices and their outputs, depending on the use case and applications within virtual and modified reality (VR/MR) scenarios. Existing wearable devices, however, typically have user specific settings that must be relied upon for various different media and use scenarios, different users, or that take effort to change or customize for each use and user. In addition, existing wearable devices are typically stand-alone devices that do not coordinate or otherwise communicate with external electronic devices. In this way, traditional VR/MR devices are limited in the type and quality of VR/MR environments that can be created by just the device itself.

Accordingly, there exists a need for wearable devices having one or more components that can automatically adjust user settings and communicate with other devices to create more immersive and customized VR/MR experiences.

SUMMARY

In a particular example of the present disclosure, a wearable electronic device includes a head mountable display (HMD) having a housing, a display, and a sensor, and a securement assembly including an electronic strap having a unique identifier, the electronic strap being removable from, and connectable to, the HMD. In such an example, the sensor detects the unique identifier and user specific settings are applied to the HMD based on the unique identifier.

In one example, the electronic strap includes an antenna that transmits data to a carrying case. In one example, the electronic strap includes a memory component storing the user specific data that includes the user specific settings. In one example, the HMD generates a user specific output based on the user specific data. In one example, the electronic strap directs a state of the HMD based on a position of the electronic strap. In one example, the electronic strap transmits data to an external device.

In a particular example of the present disclosure, a head mountable display (HMD) system includes a display portion having a sensor and a modular securement assembly. The modular securement assembly is connectable to the display portion and includes a removable strap and a retention band connected to the removable strap. The removable strap can include a unique identifier and the sensor detects the removable strap via the unique identifier.

In one example of the HMD system, the display portion includes a housing and a display, the removable strap includes an antenna that transmits data associated with the unique identifier. In one example, the HMD system can further include a processor electrically connected to the sensor. The sensor receives the data including a user setting, the processor can identify the removable strap via the unique identifier, and the processor can apply the user settings to an output of the display. In one example, the antenna is configured to send an electromagnetic signal to a carrying case configured to carry the electronic device. In one example, the antenna is configured to send an electromagnetic signal to an external speaker directing the external speaker to operate in conjunction with the display portion. In one example, the modular securement assembly includes a folded configuration and the removable strap communicates with the display portion when the removable strap is in the folded configuration directing the display portion to enter a power saving mode. In one example, the removable strap communicates with the display portion directing the display portion to exit a power saving mode when the removable strap detects an approaching user. In one example, the unique identifier includes a visual image and the sensor includes an optical sensor configured to detect the visual image. In one example, the visual image can include a QR code or a bar code.

In another particular example of the present disclosure, a modular securement assembly includes a connector strap including an antenna and a connection feature configured to removably connect the connector strap to a display component. In such an example, the antenna sends an electromagnetic signal to a carrying case and the electromagnetic signal includes data indicating a position of the connector strap.

In one example of the modular securement assembly, the electromagnetic signal includes a unique identifier. In one example, the electromagnetic signal includes a user setting. In one example, the electromagnetic signal includes data indicating a power level of the display component. In one example, the connection feature includes an electrical connection.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figures 1, 2, 3:
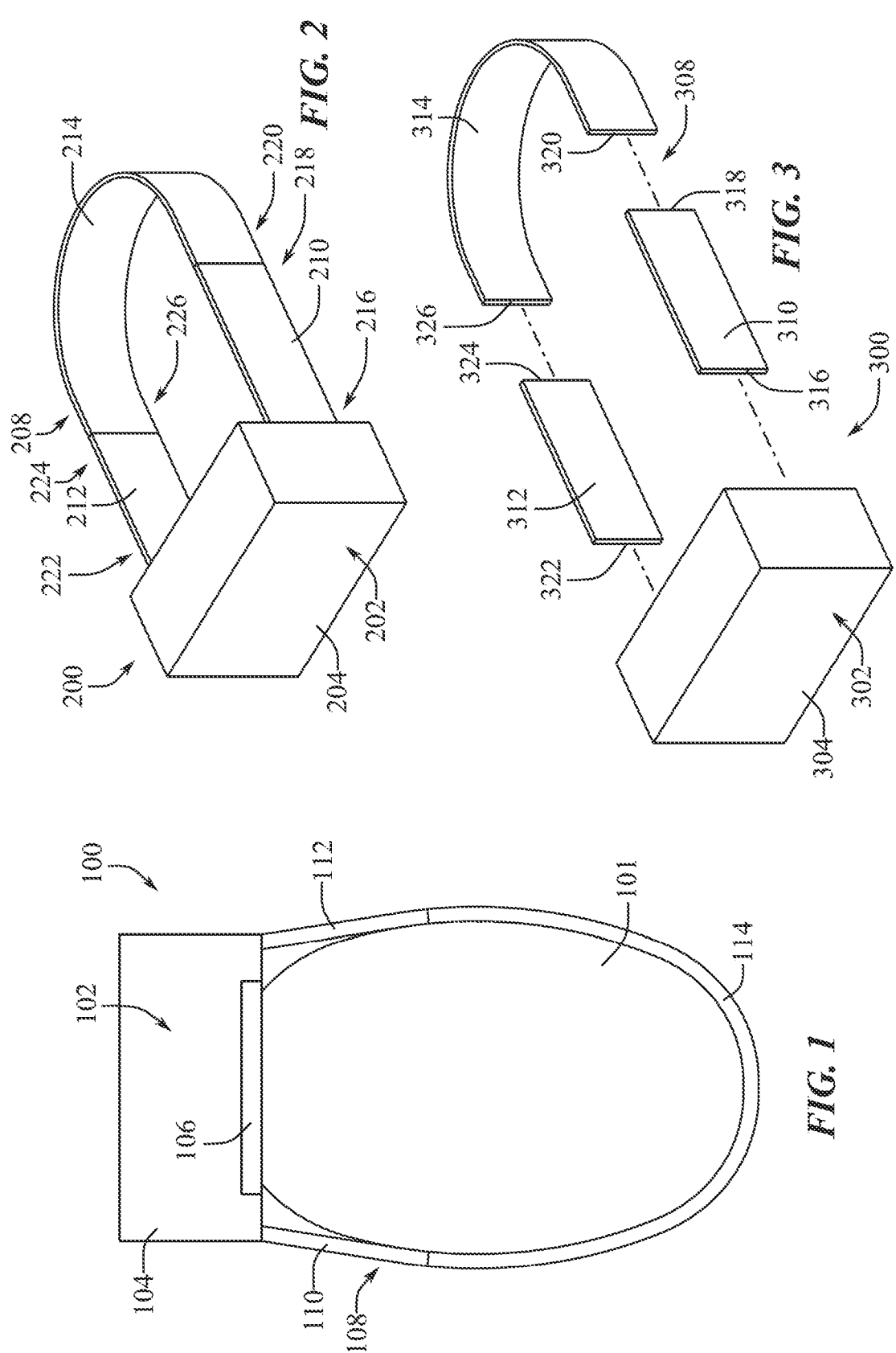
FIG. 1 shows a top view of an example of an electronic device donned by a user.
FIG. 2 shows a perspective view of an example of an electronic device.
FIG. 3 shows an exploded perspective view of an example of an electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

As virtual reality (VR) and mixed reality (MR) become more ubiquitous, the demand for user friendly head-mounted displays with quality components increases. Traditionally, these VR/MR systems have been devices that include a wearable display component, often referred to as a head-mounted display (HMD) and a supplemental unit. The supplemental unit can be part of the HMD, or can be a separate component that is permanently connected to the HMD through a cable, wires, or other conductors. The supplemental unit can provide power and/or added processing functionality to the system. The components of these systems are not interchangeable and thus only have a single configuration. VR/MR systems are increasingly being used in a variety of different environments and scenarios. Thus, it can be desirable for a VR/MR system to have different properties depending on the desired use or uses.

Devices and components thereof described in the present disclosure enable customized and enhanced experiences in VR/MR environments. For example, at least one wearable electronic device of the present disclosure include a display portion (or "HMD") and a modular securement assembly connectable to the display portion. The modular securement assembly can include a removable electronic connector strap. In at least one example, the removable electronic connector strap includes an electrical communication module. The electrical communication module of the connector strap can be configured to communicate with the display portion, one or more other components of the connector strap itself, or with other devices that can operate in conjunction with the HMD device.

In at least one example, the connector strap can further include a unique identifier that can be detected or sensed by one or more sensors of the HMD. In this way, before or after the connector strap is connected to the HMD, the connector strap can be identified. In one example, a particular connector strap or set of connector straps can be associated with a particular unique user or set of users, with user specific data associated with or stored on the connector strap. In this way, when the connector strap is connected to the HMD, the user specific data can be communicated to the HMD, or one or more processing and sensing components thereof, and the output settings or other settings of the HMD can be applied and customized to the user. In some examples, the user specific data is stored on the HMD and retrieved based on the detected connector strap.

In this way, one or more users, which may all use the same HMD device, for example a family device within a home, can use their own modular connector straps, which they can each connect to the HMD with each use, and the HMD will operate according to user settings associated with that person. Thus, the HMD can automatically be tailored and applied to the desired settings of each user without hassle.

In addition, connector straps of wearable electronic devices described herein can include electrical communication modules, such as antennas, which communicate with external devices separate from the HMD to which the connector straps are connected. Communication between the connector straps and various external and separate devices can direct the outputs of those other devices to correspond to the outputs of the HMD device, both visual and audio outputs. In this way, the devices and modular connector straps described herein can enable immersive, enhanced user experiences in VR/MR settings.

Furthermore, VR/MR devices and components thereof, including connector straps having sensors and communication modules, can detect and identify other devices worn or donned by a user, for example a user's smartwatch on his or her wrist or a user's smartphone in his or her pocket. Once detected, the connector straps or other components of the VR/MR devices described herein can identify the approaching user and automatically update or apply the settings of the VR/MR device before the user assembles or begins using the device. In this way, the customization of the HMD for each use and for each user, in combination with the integration of other devices, can effortlessly provide tailored and immersive VR/MR experiences.

These and other embodiments are discussed below with reference to FIGS. 1-12. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 shows a wearable electronic device 100 being worn on the head 101 of a user. The wearable electronic device 100, as well as other wearable electronic devices disclosed herein, can also be referred to as electronic devices or simply as devices. The device 100 can include a number of modular components. For example, the device 100 can include a head-mounted display (HMD) 102 including a housing 104 and a display 106 attached to the housing for displaying images to a user. In addition, one example of the device 100 can include a modular securement assembly 108 that secures the HMD 102 to the user's head 101. The HMD can also be referred to as a display portion or display module having display 106. The display portion can include the housing 104 and display 106 that at least partially constitutes the HMD. In one or more examples, including the example shown in FIG. 1 and other examples shown in other figures, the HMD 102 can also be referred to as an output component, output module. Such output components, modules, or portions can include one or more outputs other than visual outputs from a display. For example, an output module similar to the HMD 102 can include a speaker that outputs sound instead of or in addition to the display 106 shown in FIG. 1.

While a user wearing an HMD 102 on his or her head 101 is shown as one example of a wearable electronic device, the modular components, features, and advantages of various examples of electronic devices disclosed herein can also apply to other wearable electronic devices having securement mechanisms, including but not limited to wearable smart watches, fitness trackers, smart glasses, medical monitor devices, and so forth. For example, the housing 104 and display 106 of HMD 102 shown in FIG. 1 can also be configured as a housing and display for a smart watch module secured to the user's arm or wrist via a modular securement mechanism or assembly similar to the securement assembly 108 shown in FIG. 1. Although referred to as a wearable electronic device 100, it should be understood that the device 100 can include multiple modular components or devices and can be interchangeably referred to as a wearable electronic device, wearable electronic device system, and/or wearable electronic system. Additionally, although the particular component 102 can be referred to as an HMD, it should be understood that the terms HMD, HMD device, and/or HMD system can be used to refer to the wearable device 100 as a whole.

In one example, the modular securement assembly 108 of FIG. 1 can include a first connector strap 110 and a second connector strap 112 that removably connects to a retention band 114. Each of the connector straps 110 and 112 can be removably connected to the HMD 102 (or the housing or the display portion thereof) and the retention band 114 at opposing ends of each connector strap 110, 112 as shown in FIG. 1. In such an example, the securement band 108 is modular in that each of the connector straps 110, 112, and the retention band 114 can be removably connected to one another as shown. That is, each of the first and second connector straps 110, 112 can be removed from the modular securement assembly 108 and replaced with one or more other modules, straps, or electronic components. The modular securement assembly 108 is configured to removably secure the wearable electronic device 100, including the HMD 102, to the head 101 of the user when the connector straps 110, 112 and retention band 114 are connected as shown in FIG. 1.

One or more other examples of the device 100 can include more or less than the first and second connector straps 110, 112 shown in FIG. 1, which can be positioned elsewhere along the securement assembly 108 other than what is shown in FIG. 1. In addition, one or more examples of wearable electronic devices described herein can include one or more intermediate members, flexible straps, or other optional supplemental components and electronic modules such as external power supplies, memory components, and/or processors.

In the example shown in FIG. 1, when the device 100 is worn on the head of the user, the first securement strap 110 is positioned on the left side of the user's head and the second securement strap 112 is positioned on the right side of the user's head. The retention band 114 can span between the first and second connector straps 110, 112 to wrap around the back of the user's head, as shown.

In some examples, and as shown, the device 100 can be worn on the user's head 101 such that the HMD 102 is worn on the user's face and disposed over one or both of their eyes. The HMD can be removably and/or releasably connected to the connector strap or straps 110, 112 as described further herein. In some examples, the connector straps 110, 112 can be positioned against the side of a user's head 101 and in contact therewith. In some examples, the connector straps 110, 112 can be positioned above the user's ear or ears. In some examples, the connector straps 110, 112 can be positioned adjacent to the user's ear or ears. The connector straps 110, 112 can be removably connected to the retention band 114, which can extend around the user's head 101 and removably connect to the other of the connector straps 110, 112. In this way, the HMD 102, connector straps 110, 112, and retention band 114 can form a loop that can retain the wearable electronic device 100 on the user's head 101.

As shown in FIG. 1, the connector straps 110, 112 can connect to the HMD 102, both mechanically and electrically, at an HMD connection location that can include an electrical input or electrical connector that is attached to the housing 104 and electrically connected to the display 106. This location can be identified as a temple area that can be defined as an area near a user's temple adjacent to the user's eye, and can span from in front of the user's eye to approximately 1-1.5 inches past the outer corner of a user's eye, along the side of the user's head 101.

Similarly, the connector straps 110, 112 can connect to the retention band 114 at a retention band connection location identified as an area that can span to include the area above the user's ear or within 0.5 inches of the outer edge of the ear on either side. In this manner, the connector straps 110, 112 are able to provide structural support between the HMD 102 and the user's ear, while securely connecting the retention band 114 and translating the retention forces of the retention band 114 through the device 100. It should be understood, however, that this configuration is just one example of how the components of a modular wearable electronic device 100 can be arranged, and that in some, a different number of connector straps and/or retention bands can be included.

Any of the features, components, parts, including the arrangements and configurations thereof shown in FIG. 1 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 1.

FIG. 2 shows a perspective view of an example of a wearable electronic device 200 that includes a display portion 202 in the form of an HMD with a housing 204. The display portion 202 can be secured to the head of a user via a modular securement assembly 208 that can include a first connector strap 210 and a second connector strap 212. The first connector strap 210 can be removably connected to the display portion 202, or the housing 204 thereof, at a first end 216 of the first connector strap 210. A second end 218 of the first connector strap 210 can be removably connected to a first end 220 of the retention band 214. Likewise, the second connector strap 212 can be removably connected to the display portion 202, or the housing 204 thereof, at a first end 222 of the second connector strap 212. A second end 224 of the second connector strap 212 can be removably connected to a second end 226 of the retention band 214.

FIG. 3 shows an exploded perspective view of an example of a wearable electronic device 300, similar to the device 200 shown in FIG. 2. The device 300 of FIG. 3 includes a display portion 302 in the form of an HMD with a housing 304. The display portion 302 can be secured to the head of a user via a modular securement assembly 308 that can include a first connector strap 310 and a second connector strap 312. The first connector strap 310 can be removably connected to the display portion 302, or the housing 304 thereof, at a first end 316 of the first connector strap 310. A second end 318 of the first connector strap 310 can be removably connected to a first end 320 of the retention band 314. Likewise, the second connector strap 312 can be removably connected to the display portion 302, or the housing 304 thereof, at a first end 322 of the second connector strap 312. A second end 324 of the second connector strap 312 can be removably connected to a second end 326 of the retention band 314.

The example of the device 300 in FIG. 3 is shown in an exploded view to illustrate the modularity of the securement assembly 308, where each of the first and second connector straps 310, 312 can be individually removed or replaced and removably connected with the retention band 314 and display portion 302 or other display component or other output component such as a speaker component or module.

Any of the features, components, parts, including the arrangements and configurations thereof shown in FIGS. 2 and 3 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 2 and 3.

Figure 4:
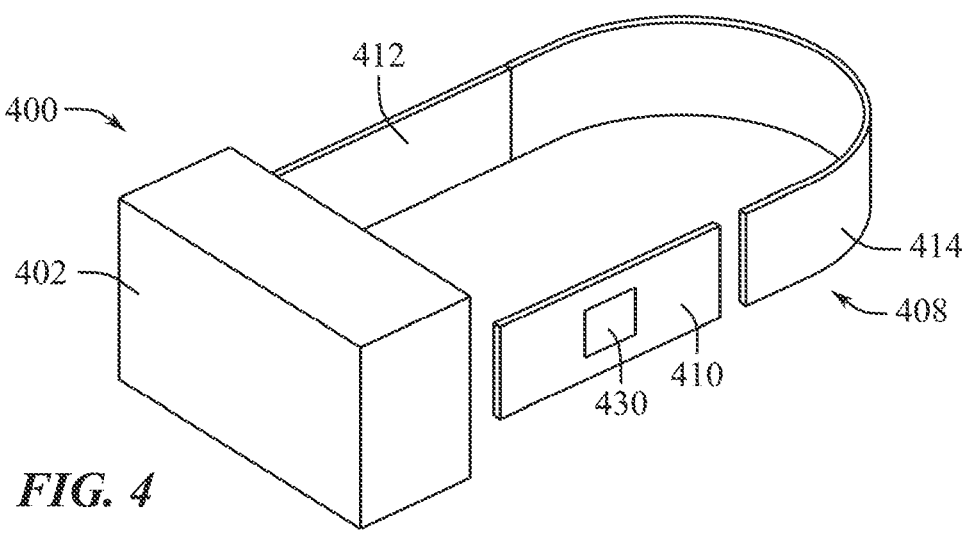
FIG. 4 shows a perspective view of an example of an electronic device.

FIG. 4 shows a perspective view of an example of a wearable electronic device 400. The device 400 can include a first electronic strap 410, which can be similar to the first and second connector straps 310, 312 shown in FIG. 3 as well as FIGS. 1 and 2. Such straps can be referred to as "electronic straps," for example electronic strap 410, which incorporate one or more electronic components, modules, or functionalities. The device 400 can also include at least one other connector strap, including second electronic strap 412, as shown in FIG. 4. Both first and second electronic straps 410, 412 can include all the features of connector straps and electronic straps described elsewhere herein, including being configured to be removably connected to the HMD 402 and the retention band 414. The first and second electronic straps 410, 412 can be independently removed from the retention band 414 of the securement member 408 and/or the HMD 402. In the example shown in FIG. 4, the first electronic strap 410 is disconnected from both the HMD 402 and the retention band 414 The retention band 414, first electronic strap 410, and second electronic strap 412 can form a securement assembly 408 configured to removably secure the device 400 to the head of a user.

An outer side of the first electronic strap 410 is shown in FIG. 4, which is the side oriented away from the user's head during donning of the device 400, and an inner side of the second electronic strap 412 is shown in FIG. 4, which is the side oriented toward or at least in partial contact with the user's head during donning of the device 400. The components and features of one electronic strap 410, 412 shown on the outer or inner sides thereof, can also apply to the other strap even if not shown from the perspective view of FIG. 4. For example, the first electronic strap 430 includes an electrical communication module 430. The electrical communication module 430 is shown on the outer surface of the first electronic strap 410 but can also be disposed elsewhere, for example on the inner side thereof (not shown). Likewise, the second electronic strap 412 can include one or more electrical communication modules, similar or different from electrical communication module 430 of first electronic strap 410.

In addition, the position of the electrical communication module 430 of the first electronic strap 410 can vary from one example to the other. In FIG. 4, the electrical communication module 430 is shown as disposed on the outer side thereof. However, in one or more other examples, the electrical communication module 430 can be disposed on the inner surface thereof (not shown), or within a thickness of the first electronic strap 410. In one or more examples, the electrical communication module 430 can be visible to the user. In one or more examples, the electrical communication module 430 can be hidden from view within the material, casing, or housing forming the first electronic strap 410.

In general, while some figures of the present disclosure include components and features associated with one connector strap or electronic strap and not on another, as shown in a particular figure, it is to be understood that any component or feature illustrated and described with reference to one connector/electronic strap can be applied to the other or others, even if not shown explicitly in the figures. Often, the figures show perspective views of the straps in order to illustrate both the inner and outer sides of the straps, for illustrative purposes, but this is not meant as limiting any one strap or set of straps to the features and components shown in the figure. For example, the first electronic strap 410 of FIG. 4 includes an electrical communication module 430 while the second electronic strap 412 does not show an associated communication module or any other component or feature. However, it is understood that, from the description of the first electronic strap 410 herein, the second electronic strap 412 can also include one or more of the electrical communication modules described with reference to the first electronic strap 410. The same is understood for other components and features of straps described with reference to other figures herein.

In at least one example, the electrical communication module 430 can include one or more of a number of communication components or devices, including, but not limited to, transmitter/receiver devices such antennas, Bluetooth modules, near field communication (NFC) components, UWB stacks and components, as well as associated circuitry and electrical software and hardware components associated therewith. The term "antenna," as used herein, can refer generally to the various categories and types of electrical communication modules described above.

Such an electrical communication module 430 can send and receive electromagnetic signals containing information and data from and to the electronic strap 410, respectively. In this way, the electronic strap 410 is configured to communicate with one or more separate portions of the device 400, including the HMD 402 or other electronic straps, which can also include one or more antennas or other transmitter receiver modules configured to send and/or receive electromagnetic signals to and from the electrical communication module 430 of the electronic strap 410. In addition, the electrical communication module 430 is configured to send and receive electromagnetic signals containing information to and from electronic devices and communication modules other than the device 400 other components associated therewith. In one example, the electronic strap 410 can communicate with a separate device such as a smart speaker, other HMD device, a carrying case, a smartwatch, smartphone, or any other separate electronic device having one or more communication modules configured to communicate with the electrical communication module 420 of the electronic strap 410.

In addition, or alternatively, to the transmitter/receiver modules noted above, one or more examples of the device 400 can have an electronic strap 410 that includes circuitry including one or more communication circuits that include one or more of a memory component, processor, printed-circuit board, or other communication circuitry tied to the memory component and processor. Such circuitry can also include one or more antennas or other transmitter/receiver modules in communication with the electrical communication module 430. Alternatively, such circuitry can be hardwired to the electrical communication module 430 such that information from the electromagnetic signals sent and received by the electrical communication module 430 can be stored, processed, and/or transmitted via the hardwired circuitry noted above.

Any of the features, components, parts, including the arrangements and configurations thereof shown in FIG. 4 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 4.

Figure 5:
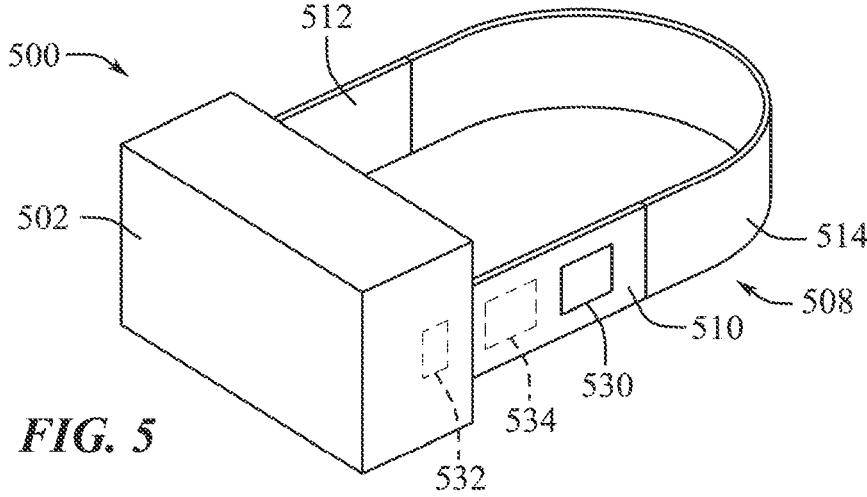
FIG. 5 shows a perspective view of an example of an electronic device.

FIG. 5 shows a perspective view of another example of a wearable electronic device 500. The device 500 can include an HMD 502 having at least one sensor 532 and a securement assembly 508. The securement assembly 508 can include one or more removable electronic connector straps 510, 512, both or either of which can be removably connected to the HMD 502 and the retention band 514 and include any additional components and features of each other or other electronic connector straps described herein. For example, connector strap 510 can include an electronic communication module, such as antenna 530, as well as a unique identifier 534 associated with the particular connector strap 510. Other electronic connector straps described herein, including connector strap 512, can include identifiers that are unique to those straps.

In at least one example, the sensor 532 of the HMD 502 is configured to sense the unique identifier 534. In one example, the sensor 532 can include one or more transmitter/receiver components including one or more antennas, UWB stacks, NFC modules, radio-frequency (RF) tags, and so forth. In one example, the sensor 532 is configured to send and receive signals including data associated with the unique identifier 534. In such an example, the unique identifier 534 can include one or more signals sent by the antenna 530. In one example, the antenna 530 is electrically connected to the unique identifier 534 such that data of the unique identifier 534 is sent and received to and from the sensor 532 of the HMD 502 via the antenna 530. In at least one example, the electromagnetic signal transmitted by the antenna 530 can include the unique identifier.

Other examples of the sensor 530 and/or unique identifier 534 can include Hall Effect sensors and magnets, capacitive sensors and corresponding electrically charged components, ultra violet (UV) ink/tags and UV sensors, optical sensors such as camera sensors with unique identifiers that include images, or any other sensor or unique identifier configured to be sensed by a corresponding sensor of the HMD 502. In one or more examples, the sensor 530 can be configured to read or identify a QR code or a bar code, or other visual identification features of the unique identifier 534. In some examples, the unique identifier can be any visual image, symbol or code configured to be visualized by the sensor 530 in the form of an optical sensor such as a camera or other visual detection system.

In at least one example, the various types of sensors 532 can sense the various types of corresponding unique identifiers 534 when the connector strap 510 is connected to the HMD 502 and when the connector strap 510 is not connected to the HMD 502. In this way, the unique identifier 534 can be sensed prior to connecting the connector strap 510 to the HMD 502 and prior to use. As noted above, the unique identifier 534 can be associated with the connector strap 510 such that data from a memory component or certain data associated with the unique identifier 534 can be communicated to the HMD 502, either to a sensor or processor of the HMD 502, prior to use and assembly of the device 500.

In addition, or alternatively, to the various types of sensors 532 and unique identifier 534 discussed above, one or more examples of sensors 532 can include sensing circuitry, including PCBs, processors, memory components, and other electrical circuitry components that carry signals containing data from the connector strap 510 to the HMD 502, for example to one or more processors of the HMD 502 (not shown). When connected to the HMD 502 as shown in FIG. 5, the strap 510 can communicate certain data associated with the unique identifier 534, which correlates to that specific connector strap 510, to the HMD 502 or components associated therewith, including processors, sensors, antennas, sensing and processing circuitry, and so forth. This circuitry connected to or associated with the unique identifier 534 and/or the antenna 530 can connect to circuitry of the HMD 502, for example circuitry connected to the sensor 532 or other processing or memory components of the HMD 502, to relay the data associated with the unique identifier 534 to the HMD or processing units thereof.

In at least one example, data or information associated with the unique identifier 534 can be stored or carried by the unique identifier 534 itself, for example in cases where the unique identifier includes an RF tag, memory components, or other data storage and communication component, or the data or information can be carried by a memory component or other data storage and/or transfer component in electrical communication with the unique identifier 534. Thus, during use when the unique identifier 534 of the connector strap 510 is sensed by the sensor 532 of the HMD 502, the associated data and/or information corresponding to or associated with the unique identifier 534 can be transferred or communicated to the HMD 502, including to one or more sensors/antennas, processors, or other computing components of the HMD 502 not shown in FIG. 5. Again, as noted above, the unique identifier 534 can be sensed by the sensor 532 prior to or after the connector strap 510 is connected to the HMD 502.

In at least one example, once the connector strap 510 has been sensed, detected, and identified via the sensor 532 and the unique identifier 534, the HMD 502 can be configured to output a confirmatory or verification signal. In one example, a speaker and/or display of the HMD 502 can produce an audio and/or visual verification output to verify to the user that the connector strap 510 has been identified and which user the connector strap 510 is associated with.

In at least one example, the data and/or information stored by the unique identifier 534, or associated with the unique identifier 534 but stored on a separate memory or processing component of the connector strap 510, includes user specific data. The user specific data, when communicated or otherwise transferred to the HMD 502 as noted above, can be used to affect an output of the HMD 502, for example a displayed image or sound of the HMD 502 output to the user, via one or more processors connected to the sensor 532 and connected to the display or other output component of the HMD 502. In this way, the HMD 502 can generate a user specific output based on the user specific data associated with the unique identifier 534 of the connector strap 510.

For example, once the unique identifier 534 is sensed by the sensor 532 and the data/information associated with the connector strap 510 is received by the HMD 502, a processor of the HMD can cause any number of user settings to change, adapt, or otherwise be applied to the user who owns or is associated with the connector strap 510 being used. In this way, the unique identifier 534 can be associated with a specific user who uses, owns, or is otherwise associated with the connector strap 510 of which the unique identifier 534 is a part.

Any of the features, components, parts, including the arrangements and configurations thereof shown in FIG. 5 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 5.

Figure 6:
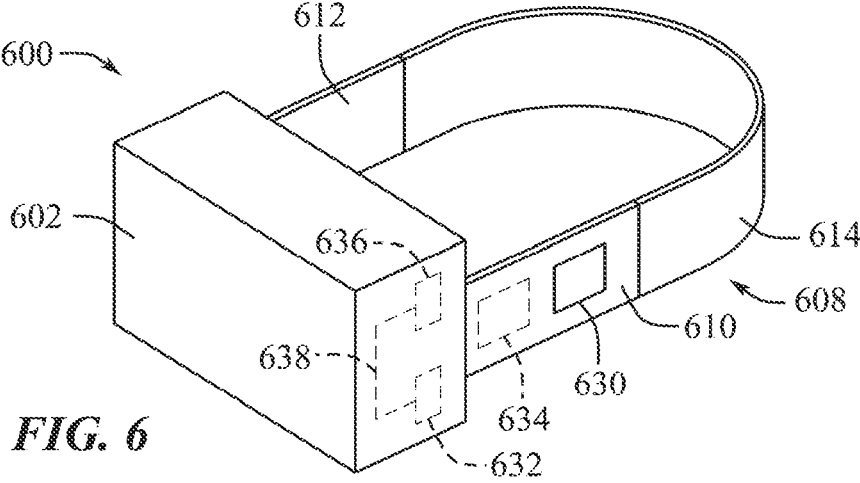
FIG. 6 shows a perspective view of an example of an electronic device.

FIG. 6 shows a perspective view of another example of a wearable electronic device 600. The device 600 can include an HMD 602 having at least one sensor 632 and a securement assembly 608. The securement assembly 608 can include one or more removable electronic connector straps 610, 612, both or either of which can be removably connected to the HMD 602 and the retention band 614 and include any additional components and features of each other or other electronic connector straps described herein. For example, connector strap 610 can include an electronic communication module, such as antenna 630, as well as a unique identifier 634 associated with the particular connector strap 610. Other electronic connector straps described herein, including connector strap 612, can include identifiers that are unique to those straps.

In addition, the HMD 602 of the device 600 shown in FIG. 6 can include one or more processors 636 electrically connected to the sensor 632 via circuitry 638. As noted above, the sensor 632 can include data transmitting components that transmit data or information associated with the connector strap 610 and unique identifier 634 thereof to the processor 636 via the circuitry electrically connecting the processor 636 to the sensor 632. In this way, the processor 636 identifies the connector strap 610 In turn, the processor 636, which can be electrically connected to one or more other components of the HDM 602, including display screens, microphones, speakers, and the like, can cause one or more user settings of the HMD 602 to be set, applied, changed, or adapted in order to accommodate the user associated with the sensed/detected connector strap 610. The processor 636 can identify the connector strap 610 based on the detected/sensed unique identifier 634 that is uniquely associated with the connector strap 610.

In one example, the user settings that can be applied or changed based on the connector strap 610 can include one or more of a display screen brightness, speaker volume, one or more icons including user selectable icons displayed by the HMD 602, memory and settings associated with certain games, movies, or other stored digital content output by the HMD 602, and so forth. Any software application run by the HMD 602 or any other functionality or operation of the HMD 602 can be altered and adapted to match pre-determined or pre-selected setting that are unique and customized to the user associated with the connector strap 610.

As described herein, connector strap 610 shown in FIG. 6 as well as other electronic connector straps disclosed elsewhere herein, can be associated with a unique user or a set of unique users. In one example, the HMD 602 portion of the device 600 can be owned or used by multiple users, for example multiple people within a household or work environment, with each user having his or her own connector strap 610 or set of connector straps 610, 612. Before using the HMD 602, each user can connect their own connector straps 610, 612 (or connector straps "associated with" that user) to the retention band 614 and HMD 602. As noted above, the user's connector strap 610 or set of connector straps 610, 612 can be sensed/detected by the sensor 632 of the HMD 602 and user settings customized to that user can be presented by the HMD 602.

In one example, the user settings associate with a user, which can be stored by the connector strap 610 that sends data/information associated with the user to the HMD 602, as discussed above, can be pre-set or pre-saved during a first time use of the connector strap 610 and a memory component, including a memory component associated with or a part of the unique identifier 634 of the connector strap 610. That is, once detected or connected to the HMD 602, the HMD 602 can display a number of selectable and adjustable user settings to the user the first time the user uses the device 600. The user can select his or her desired settings and the HMD 602 can communicate the data/information associated with those settings back to the connector strap 610 via one or more processors, sensors, circuitry, or other data transmitting components, including processor 635, circuitry 638, and sensor 632. As noted above, the data/information associated with the particular user settings set by the user of the connector strap 610 can be stored by the unique identifier 634 or another data storage component associated with the unique identifier 634 such that every time the particular connector strap 610 is used, the same user settings are manifest by the HMD 602.

In another example, the data or information associated with the selected user settings are not transmitted back to the connector strap 610. Rather, in at least one example, the HMD 602 includes one or more data storage/memory components that stores the user-specific data thereon. In such an example, when the unique identifier 634 of a certain connector strap 610 is sensed by the sensor 632 of the HMD 602 and identified or detected by the processor 636, the processor 636 can cause the data/information of the user settings associated with the unique identifier 634, which are stored on the memory/data storage component of the HMD 602, to be manifest to the user during use.

The connector strap 610 can then be removed or otherwise disconnected from the HMD 602 after use by that person and then another, different strap 610 or set of straps 610, 612 can be connected to the HMD 602 by another user. In the same way as described above, new user settings and data/information associated with the new user, as communicated via the sensed and detected unique identifier 634 of the new connector straps 610 can be output by the HMD 602.

As noted above, user settings can include any number of output features and characteristics of output features output by the HMD 602. In one example, a first set of icons representing a list of games or movies in a selectable menu can be output to a first user, with the icons representing pre-selected icons or automatically selected icons based on the user's history of use, and a second set of icons can be presented to another user based on a different unique identifier 634 sensed and detected for use with a different user. As noted above, any number of other settings can be uniquely associated with each connector strap 610, including display brightness, speaker volume, content menus displayed by the HMD, user history and information including connections between the HMD and any other devices used by the user such as smartwatches, phones, tablets, laptops, and the like.

Any of the features, components, parts, including the arrangements and configurations thereof shown in FIG. 6 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 6.

Figure 7A:
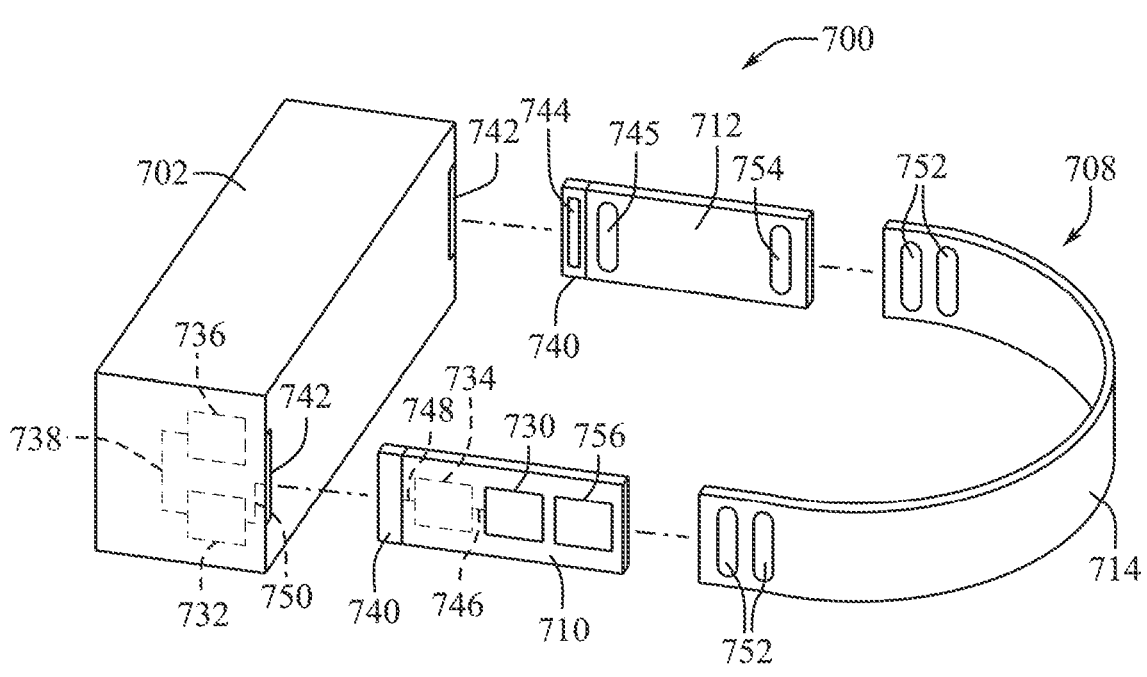
FIG. 7A shows a perspective view of an example of an electronic device with some components disconnected.
Figure 7B:
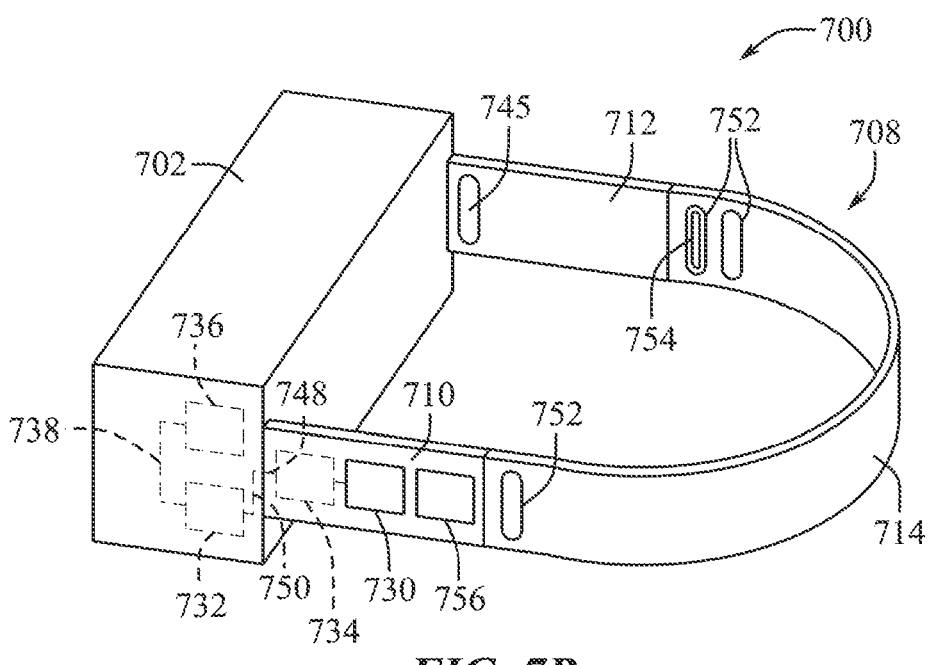
FIG. 7B shows a perspective view thereof with connected components.

FIGS. 7A and 7B show perspective views of another example of a wearable electronic device 700 according to the present disclosure. FIG. 7A shows the device 700 with removable electronic connector straps 710, 712 disconnected from the display portion/output module of the HMD 702 and the retention strap 714. As noted above, the perspective view of FIGS. 7A and 7B illustrate the outer side of the removable strap 710 and the inner side of the removable strap 712 in order to illustrate various components thereof. However, none of the removable straps 710, 712 are limited to those components shown only in FIGS. 7A and 7B and both removable straps 710, 712 can include any features shown on either side of either removable strap 710, 712 or other removable electronic straps shown in other figures and described herein.

In the illustrated example of FIG. 7A, removable strap 710 can include a unique identifier 734 connected to an electrical communication module 730, for example an antenna or other transmitter/receiver module, via circuitry 746. In addition, removable strap 710 can also include a connection feature 740, such as a mechanical or electrical connection feature configured to connect to a corresponding connection feature 742 of the HMD 702. The one or more connectors of the device 700, including connection feature 740 of removable straps 710, 712 and the connection feature of the display portion/HMD 702 can form a connector that physically connects the removable straps 710, 712 to the HMD 702. The connector and connection features 740, 742 can be configured to removably connect such that the removable straps 710, 712 can be removed or disconnected from the HMD 702.

As shown on the inner side of removable strap 712, the connection feature 740 can also include an electrical contact 744 feature or surface that completes a circuit between at least the circuitry 748 connected to the unique identifier 734 and circuitry 750 of the HMD 702 connecting to the sensor 732. Further, the sensor 732 of the HMD 702 can be connected to one or more processors 736, memory components, or other electronic components of the HMD 702 via circuitry 728. Also, as shown in FIG. 7A, circuitry 746 can connect the unique identifier 734 and the electrical communication module 730 such that the processor 736, sensor 732, unique identifier 734, and electrical communication module

730 are all connected via one or more circuitry components when the connection feature 740 of the removable strap 710 connects to the HMD 702 at the connection feature 742 of the HMD 702, as shown in FIG. 7B.

In this way, in at least one example, the various electronic components of the removable straps 710, 712 can be hardwired and in communication with various electronic components of the HMD 702. Alternatively, or additionally, in at least one example, communication between components of the removable strap 710 and the HMD 702 can occur wirelessly via one or more sensors/transmitters/receivers/antennas/memory components and so forth of the removable strap 710 and HMD 702 as noted above with reference to other figures and examples.

Further, in at least one example, the electrical contact 744 and/or the connection feature 744 of the removable straps 710, 712 can complete a power circuit when connected with the connection feature 742 of the HMD 702 such that either or both of the removable straps 710, 712 are configured to deliver electrical power to the HMD 702. A power source, such as a battery or power port plugged into an external power source such as a wall outlet or separate battery, can provide electrical power to the removable straps 710, 712, which can then be delivered to the HMD 702 when the one or more removable straps 710, 712 are connected to the HMD. In some examples the HMD 702 include its own power port or battery to power the HMD 702.

In addition, at least one example of the device 700 can include one or more other components. For example, removable strap 710 can include one or more additional electronic or other components including electronic module 756. In one example, electronic module 756 can include one or more memory components noted above, PCBs, processors, associated circuitry components or other electronic components noted above with reference to other examples. In at least one example, the electronic module 756 can include one or more output components such as one or more speakers configured to output audio content in conjunction with and corresponding to visual content output by a display portion of the HMD 702 during use.

As with other electronic components of the removable strap 710, communication between the electronic module 756 and various components of the HMD 702 can occur wirelessly through antennas, for example the electrical communication module 730 of the removable strap 710, or the communication/transmission of data can occur through various hardwired connections, circuits, and circuitry connecting the electronic module 756 to other components of the removable strap 710 and ultimately to the various electronic components of the HMD 702 when the removable strap 710 is connected to the HMD 702 as shown in FIG. 7B.

In addition, at least one example of the device 700 can include one or more sensors or other electronic or mechanical components. For example, removable strap 712 includes a release button 745 configured to be pressed or manipulated to disconnect the connection feature 740 of the removable strap 712 from the connection feature 743 or connector of the HMD 702, thus disconnecting the removable strap 712 from the device 700. Also, in at least one example, the removable strap 712 can include one or more features 754 configured to be coupled with one or more adjustment/connection features 752 of the retention band 714. FIG. 7B shows the feature 754 of the removable strap 712 coupled with the adjustment/connection feature 752 of the retention band 714 when removably coupled or connected together.

Any of the features, components, parts, including the arrangements and configurations thereof shown in FIG. 7 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 7.

As discussed above with reference to various examples of wearable electronic devices and components thereof, including display portions and HMDs, removable electronic connector straps, and electronic component of those straps and HMDs, one or more removable electronic straps of devices described herein can include one or more electrical communication modules that communicate with the HMD, other components of the wearable electronic devices, or devices separate from the wearable electronic devices described herein. In some examples, as discussed above, such communication or transfer of data/information from the connector straps to various other devices and components can occur wirelessly through the various antennas and sensors described herein. In some example, for instance when the connector straps are communicating with the HMD portion of a device, the communication can occur through hardwired circuitry and components. In general, the term "communicate," "communication," or other related terms as used herein with reference the removable electronic connector straps communicating with other components and devices, refers to the transfer of data and information from one device or component to another.

In addition, it will be understood by one of ordinary skill in the art that the removable electronic connector straps can communicate or be configured to communicate through one or more communication modules or components thereof, even if the particular communication module or component of the removable electronic connector strap is not referred to specifically. Thus, as described herein, the removable electronic connector straps of the various wearable electronic devices described herein are configured to communicate with other components and devices.

Figure 9:
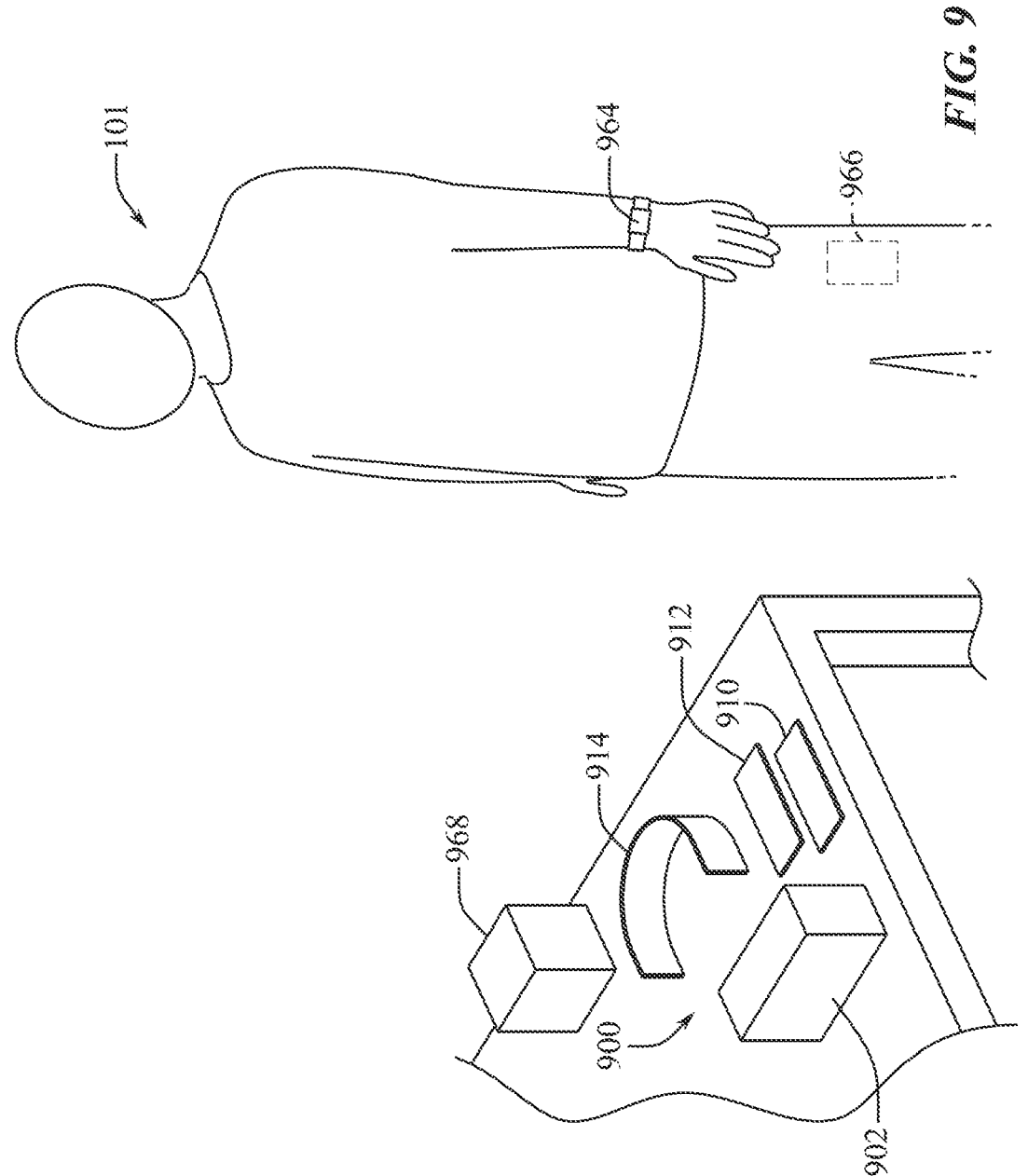
FIG. 9 shows an example of an electronic device and various separate devices of a user.

As shown in FIG. 9, for example, a wearable electronic device 800 can communicate with one or more other devices via the connector straps 810, 812 of the device 800. In one example, the device 800 includes an HMD 802 removably secured to the head 101 of the user via the securement assembly 808. The securement assembly 808 can include left and right connector straps 810, 812 similar to other removable electronic connector straps disclosed herein, which removably connect to a retention band 814 of the securement assembly 808. The connector straps are also removably connected to the HMD 802 such that a display screen 806 of the HMD 802 directs visual images and outputs to the user's eyes during use.

In the illustrated example, connector straps 810, 812 include electrical communication modules, such as antennas 830 configured to communicate with other components of the connector straps 810, 812, with the HMD 802 and various components thereof, as well as with other external devices separate from the device 800. In at least one example, the separate device or devices can include one or more speakers operating in conjunction with the displayed output of the display screen 806 of the HMD 802. That is, in one example, electromagnetic signals communicated/transmitted by the antennas 830 directing one or more external device or devices to operate in conjunction with the HMD 802. In at least one example, the separate device or devices can include one or more display screens of visual display devices operating in conjunction with the displayed output of the display screen 806 of the HMD 802. In at least one example, the separate device or devices can include one or more headphone speakers operating in conjunction with the displayed output of the display screen 806 of the HMD 802.

Figure 8:
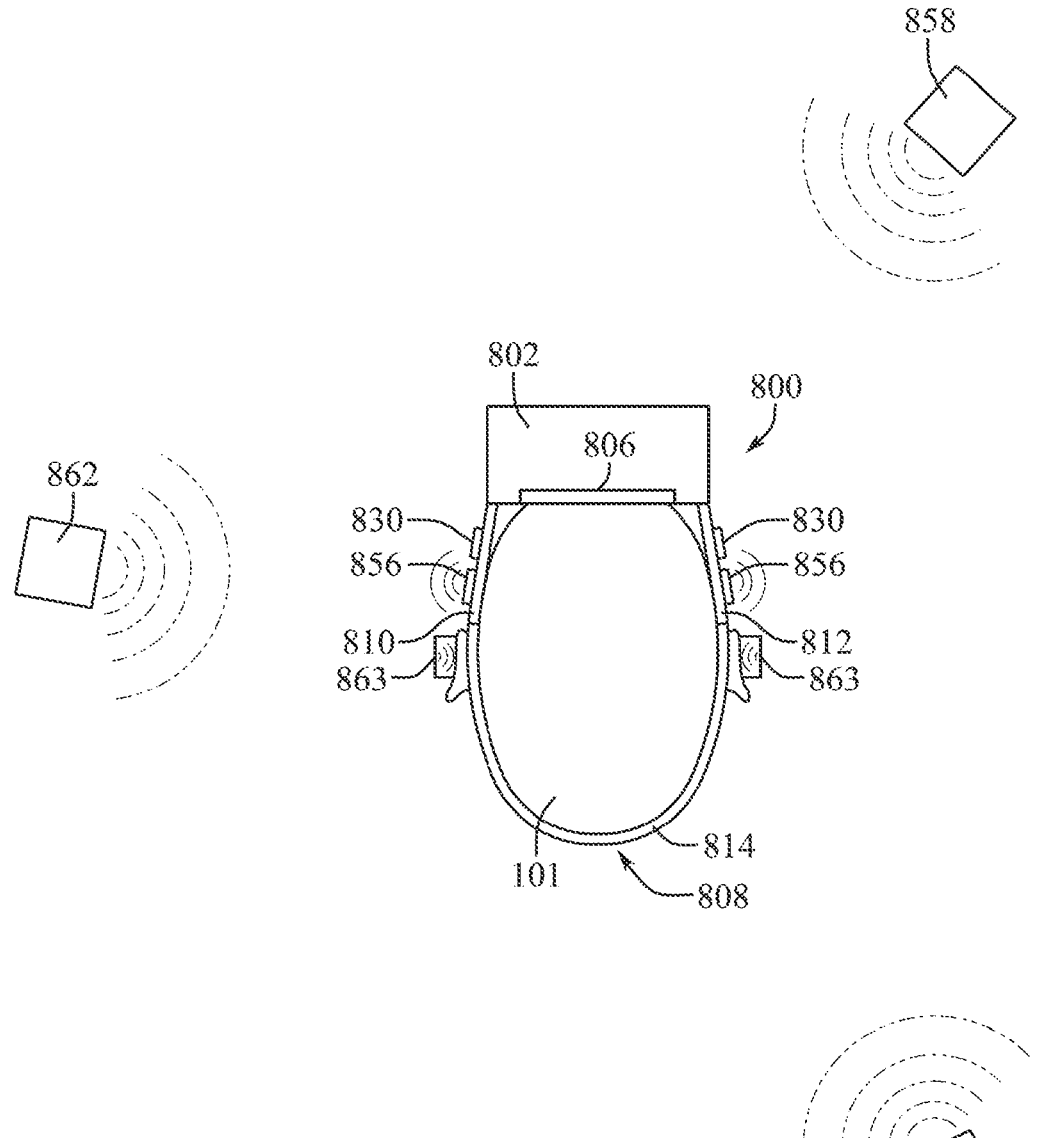
FIG. 8 shows a top view of an example of an electronic device donned by a user and communicating with separate devices.

As shown in FIG. 8, one non-limiting example of one or more external and separate devices with which the connector strap 810, 812 can communicate include external speaker 858, external speaker 860, and external speaker 862. In addition, the connector straps 810, 812 can communicate, via antennas 830, with headphones 863. Each of these external and separate devices can be configured with their own transmitter/receiver to communicate with the antennas 830 of the connector straps 810, 812. Communication between the connector straps 810, 812 and the HMD 802, in particular with certain communication, data transmission, and processing components of the HMD 802, can synchronize the audio outputs of the external and separate speakers 858-863 such the audio outputs correlate to the visual output of the display screen 806 of the HMD 802.

In addition, the connector straps 810, 812 can include speakers 856 that output sound in conjunction with and corresponding to the visual output of the display screen 806. That is, in at least one example, electromagnetic signals communicated/transmitted by the electrical antennas 830 causes the external device or multiple external devices 858-863 to operate in conjunction with the HMD 802. In this way, a whole system of external and separate devices can coordinate to create a spatial audio environment including surround sound and multi-directional sound environment to enhance the user's experience using the HMD 802. The coordination and communication with any or all of the external and separate devices 858-863 shown in FIG. 8 can occur via one or more electromagnetic signals sent and received by the electrical communication modules of the connector straps 810, 812, for example antennas 830, and those of the external and separate devices 858-863.

Any of the features, components, parts, including the arrangements and configurations thereof shown in FIG. 8 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 8.

Other non-limiting examples and advantages of removable electronic connector straps of wearable electronic devices are shown in FIG. 9. The device can be disassembled as shown, including connector straps 910, 912, retention band 914, and HMD 902. Even when disassembled, as shown, the connector straps 910, 912 can communicate with various other devices and components. In one example, before or after removably connecting the connector straps 910, 912 to the HMD 902, the connector straps 910, 912 can be identified, detected, sensed, or otherwise in communication with the HMD 902 such that user settings associated with the particular connector straps 910, 912 can be produced or manifest/output by the HMD 902 when donned by the user 101.

In this way, as discussed with reference to other examples above, a single HMD 902 can be used by multiple users with each user owning or associated with a particular unique connector strap or set of connector straps 910, 912 such that when each unique user connects the connector straps 910, 912 to the HMD 902 and begins using the device 900, it is automatically customized to that user, including specific tailored user settings. The connector straps 910, 912 are shown resting on a surface next to the HMD 902 to indicate a separation of the connector straps 910, 912 from the HMD 902, however other examples can include connector straps 910, 912 carried by the user. In such an example, as the user approaches the HMD 902 with the connector straps 910, 912, the communication, detection, or sensing of the connector straps 910, 912 can occur and settings can be updated.

In addition, in at least one example, each connector strap or set of connector straps 910, 912 can be associated with two or more users and unique identifiers and/or unique identifying information including user settings and data can be stored for each associated user on the single connector strap or single set of connector straps 910, 912. In such an example, the communication of the connector straps 910, 912 with external, separate devices can include other device associated with a unique user 101.

For example, user 101 in FIG. 9 is donning a smartwatch 964 on a wrist and a smartphone 966 in a pocket. As the user 101 approaches the connector straps 910, 912, or when a distance between the smartwatch 964 or smartphone 966 is small enough such that the connector straps 910, 912 establish communication therewith, one or more identifying features of the external devices 964, 966 can be identified. These identifying features can then be linked to the user 101 such that the connector straps 910, 912 can identify who the user is. Accordingly, the user settings saved for or associated with that user 101 can then be transmitted/communicated to the HMD 902 by the connector straps 910, 912, as described above. In this way, the correct user settings can be automatically and seamlessly applied to any outputs of the HMD 902, or any other external and separate devices operating in conjunction with the HMD 902 (such as external and separate devices 858-863 shown in FIG. 8 and described above) before or concurrently with the user's 101 use of the device 900.

In at least one example, the communication between the connector straps 910, 912 and the HMD 902 can direct the state of the HMD 902. For example, the communication between the connector straps 910, 912 and the HMD 902 can direct the HMD 902 to switch operational modes. Operational modes can include fully operational outputs during use and sleep modes or other power saving modes where the device is on but conserves power when not being used. In one example, as the user 101 approaches and the connector straps 910, 912 detects the user 101, the connector straps 910, 912 can communicate with the HMD 902 and direct the HMD 902 to exit the power saving mode and turn on or enter/operate in a more fully functional operational mode that does not conserve power.

Conversely, after use, the connector straps 910, 912 can direct the HMD 902 to enter a power saving "sleep" mode once the user 101 walks away from the device 900 after use or if the user 101 removes the connector straps 912, 910 from the HMD 902. In some instances, after using the device 900, the user 101 may remove the connector straps 910, 912 from the HMD 902 and take the connector straps 910, 912 with him or her for placement or use separate from the HMD 902. In such an instance, the connector straps 910, 912 can communicate with the HMD 902 and direct the HMD 902 to operate in a power saving sleep mode.

Another example of communication between the connector straps 910, 912 and an external, separate device include communication with a carrying case 968 of the device 900. As shown in FIG. 9, a carrying case 968 can be configured to carry the device 900, either when assembled or disassembled as shown. When the device 900 is outside the case or carried within the case, the HMD 902 and/or connector straps 910, 912 can establish communication therewith, as described herein. In one example, the carrying case 968 can include one or more antennas, sensors, or other electrical communication modules or components configured to sense, detect, and/or communicate with the connector straps 910, 912 via one or more electrical communication modules, antennas, sensors, or other components of any of the connector straps described herein. In at least one example, one or more communication modules or components of the HMD 902 can also communicate with the carrying case 968.

Any of the features, components, parts, including the arrangements and configurations thereof shown in FIG. 9 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 9.

Figure 10:
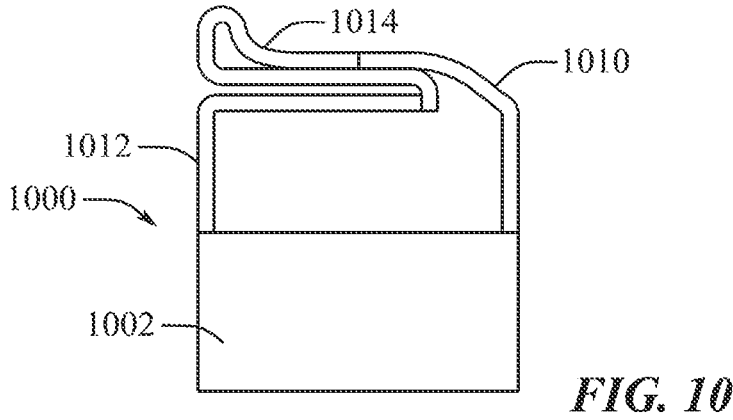
FIG. 10 shows a top view of an example of an electronic device.
Figure 11:
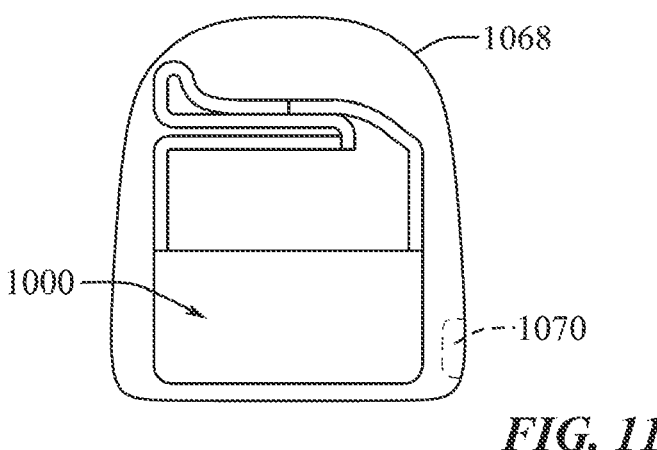
FIG. 11 shows a top view of an example of an electronic device disposed within an example of a carrying case.
Figure 12:
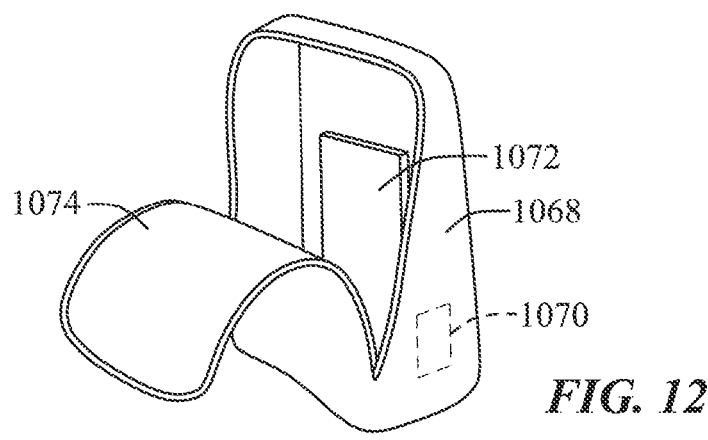
FIG. 12 shows an example of a carrying case.

FIGS. 10-12 shows more details regarding an example of a wearable electronic device 1000 and a carrying case 1068 configured to carry the device 1000. In FIG. 10, the device 1000 is shown in a compact configuration where the connector straps 1010, 1012 can be folded and the retention member 1014 is flexible to collapse when the connector straps 1010, 1012 are folded. In such a collapsed or compact configuration, such an example of a device 1000 can fit more compactly within a carrying case 1068, as shown in FIG. 11. In one or more other examples, the device 1000 can be configured or changed to another compact arrangement or positon of the connector straps 1010, 1012 and retention band 1014 other than the specific configuration thereof shown in FIG. 10. Rather, FIG. 10 shows one example as a general indication that devices described herein can be folded or compacted to be smaller.

In at least one example, the carrying case 1068 is configured and sized to receive the device 1000 or any other wearable electronic device described herein without folding or otherwise compacting the size of the device. In at least one example, the carrying case 1068 includes a communication module 1070, which can include one or more antennas or other transmitter/receiver components, sensors, or other communication circuitry and associated components. In at least one example, the connector straps 1010, 1012 can communicate with the carrying case 1068 via the communication module 1070 thereof and transmit data and information via electromagnetic signals.

In at least one example, once the device 1000 is placed within the carrying case 1068, a wireless or hardwired communication can be established or maintained between the communication module 1070 of the carrying case 1068 and the device 1000, in particular with one or more connector straps 1010, 1012 of the device 1000. In one example, the communication can be established with the HMD or display portion of the device 1000.

The electromagnetic signal transmitted by the connector straps 1010, 1012 can include data indicating a position of the connector straps 1010, 1012. In one example, communication between the connector straps 1010, 1012 and the HMD 1002 can direct the state of the HMD 1002 based on a position of the electronic connector straps 1010, 1012. In at least one example, a sensor in one or more of the connector straps 1010, 1012 can detect when the connector straps 1010, 1012 have been folded or otherwise positioned compactly. In response, the connector straps 1010, 1012 can communicate with the HMD 1002 and direct the HMD 1002 to enter a deep sleep state or power saving mode of the HMD 1002 to conserve power. That is, in at least one example, the connector straps 1010, 1012, when in a folded configuration indicative of storage or non-use, can send a signal or otherwise communicate with the HMD 1002 to cause the HMD to operate in a power save mode.

In at least one example, the carrying case 1068 is configured to charge the device 1000 via one or more batteries 1072 as shown in the open case of FIG. 12 without the device 1000 disposed therein and with a flap or door 1074 at least partially open to illustrate at least a portion of the inside of the carrying case 1068.

As noted above with reference to FIG. 8, devices and connector straps thereof described herein can be configured to communicate with one or more other separate and external devices, including other speakers, headphones, or other visual display devices. Also noted with reference to FIG. 9, devices and connector straps thereof described herein can be configured to communicate or otherwise detect and/or connect with one or more other devices, including a user's smartwatch, smartphone, tablet computer, or other device.

Accordingly, the HMD of such devices, including HMD 1002 of device 1000 shown in FIG. 10, can operate (that is, generate an output to the user) in conjunction with the outputs of the other connected external devices. In one or more examples, the HMD 1002 and/or the connector straps 1010, 1012 can also include one or more batteries powering the HMD 1002. In at least one example, the electromagnetic signals can include data indicating a power level of the HMD 1002, including how much battery life is left. In at least one example, the electromagnetic signals can include data indicating a power level of the connector straps 1010, 1012 including how much battery life is left.

However, if such outputs include, for example, music, the user may want to continue listening to the music even if the power of the HMD is running low and the user puts the device 1000 into a deep sleep or into the carrying case 1068. In such a situation, the connector straps 1010, 1012, or HMD 1002 of the device 1000 can communicate with the one or more devices of the user, for example the user's smartphone, and cause the smartphone to alert the user. The alert can include a selectable icon that provides the user the opportunity to continue streaming or otherwise communicating the musical content to the external speaker devices. In this way, the user can stop using the device 1000, or even put the device a sleep or power save mode in the carrying case 1068, but continue listening to the music through the other devices. Again, the cooperation between the device 1000 and these external devices, according to the example noted above, can be carried out by one or more connector straps 1010, 1012 and/or HMD 1002 of the device 1000 according to the communication capabilities of devices described herein.

In some examples, the system can include a band and a strap with a unique identifier. Such a band can include the following combinations and can be claimed as follows:

1. A securement component connectable to a head mountable display (HMD), the securement component comprising:
    a band; and
    an electronic strap having a unique identifier attached to the band, the electronic strap being removable from, and connectable to, the HMD;

wherein, when the unique identifier is transmitted to the HMD, the HMD detects the unique identifier and applies specific settings to the HMD based on the unique identifier.

2. The securement component of claim 1, wherein the electronic strap comprises an antenna that transmits data to a carrying case.

3. The securement component of claim 1, wherein the electronic strap comprises a memory component storing data that includes the specific settings.

4. The securement component of claim 3, wherein when the unique identifier is transmitted to the HMD, the HMD generates a user specific output based on the user specific data.

5. The securement component of claim 2, wherein the electronic strap directs a state of the
HMD based on a position of the electronic strap relative to the HMD.

6. The securement component of claim 1, wherein the electronic strap transmits data to an external device.

7. The securement component of claim 1, further comprising a band connectable to the electronic strap.

In other examples, the system can include a stand-alone strap with a unique identifier that is connectable to an HMD. Such a strap can include the following combinations and can be claimed as follows:

1. A modular securement strap, comprising:
    a unique identifier connected to the strap;
    a connection feature configured to removably connect the connector strap to a head mountable display HMD;
    wherein, when the unique identifier is transmitted to the HMD, the HMD detects the unique identifier and applies specific settings to the HMD based on the unique identifier.

2. The modular securement strap of claim 1, further comprising an antenna;
    wherein the antenna sends an electromagnetic signal to a receiving device.

3. The modular securement strap of claim 2, wherein the receiving device comprises a case.

4. The modular securement strap of claim 2, wherein the receiving device comprises the HMD.

5. The modular securement strap of claim 2, wherein the electromagnetic signal comprises data indicating a position of the connector strap.

3. The modular securement strap of claim 2, wherein the electromagnetic signal includes the unique identifier.

4. The modular securement strap of claim 2, wherein the electromagnetic signal comprises a setting.

5. The modular securement strap of claim 2, wherein the electromagnetic signal comprises data indicating a power level.

6. The modular securement strap of claim 2, wherein the connection feature comprises an electrical connection.

As used herein, a physical environment refers to a physical tangible world that people can sense and/or interact with without aid of electronic systems, using various senses. In contrast, computer-generated reality (CGR) environment is an environment that is wholly or partially simulated using an electronic system, and are often modified based on a user's detected physical motions, such as virtual reality and mixed reality. A virtual reality environment can be a simulated environment is designed to have sensory inputs that are entirely computer-generated, while a mixed reality (MR) environment is a simulated environment that incorporates inputs from the physical environment and includes computer-generated sensory inputs, such as an augmented reality or an augmented virtuality. An augmented reality environment is a simulated environment in which virtual objects are superimposed over a physical environment. An augmented virtuality environment refers to a simulated environment in which a virtual or computer generated environment incorporates one or more sensory inputs from the physical environment.

In some examples, personal information data can be used to implement and improve on the exemplary system and method described herein. However, if personal data information is collected, used, stored, or otherwise accessed, such operations should be performed according to authorized and well established secure privacy policies and practices that are appropriate for the type of data collected. The disclosed technology is not, however, rendered inoperable in the absence of such personal information data.

It will be understood that the details of the present systems and methods above can be varied and organized in various combinations and with alternative components. The scope of the present systems and methods will be further understood by the following claims.

What is claimed is:

1. A wearable electronic device, comprising:
a head mountable display (HMD) having a housing, a display, and a sensor; and
a securement assembly, comprising:
a retention band; and
an electronic strap having a unique identifier, the electronic strap being removable from, and connectable to, the HMD, the electronic strap being removable from, and connectable to, the retention band, the electronic strap including an antenna;
wherein:
the sensor detects the unique identifier;
specific settings including at least one of screen brightness, displayed icons, or memory associated with certain games, movies, or other stored content output by the HMD, are applied to the HMD based on the unique identifier; and
the antenna transmits data via electromagnetic signals to at least the HMD or a carrying case, the data indicates a position of the electronic strap, wherein the position of the electronic strap includes a folded configuration.

2. The wearable electronic device of claim 1, wherein the electronic strap comprises a memory component storing data that includes the specific settings.

3. The wearable electronic device of claim 2, wherein the HMD generates a user specific output based on a user specific data.

4. The wearable electronic device of claim 1, wherein the electronic strap directs a state of the HMD based on the position of the electronic strap.

5. The wearable electronic device of claim 1, wherein the electronic strap transmits data to an external device.

6. A head mountable display (HMD) system, comprising:
a display portion including a sensor; and
a modular securement assembly connectable to the display portion, the modular securement assembly comprising:
a removable electronic strap with an electronic component, wherein the electronic component is disposed within the removable electronic strap and is configured to be positioned near a user's temple area when donned, the removable electronic strap including an antenna; and a retention band removably connected to the removable electronic strap;
wherein:
the removable electronic strap comprises a unique identifier and the sensor detects the removable electronic strap via the unique identifier; the antenna is configured to send an electromagnetic signal to at least the HMD or a carrying case; the electromagnetic signal comprises data indication a position of the electronic strap; and the position of the electronic strap includes a folded configuration.

7. The HMD system of claim 6, wherein:
the display portion comprises a housing and a display; and
the antenna transmits data associated with the unique identifier.

8. The HMD system of claim 7, further comprising a processor electrically connected to the sensor, wherein:
the sensor receives the data including a setting;
the processor identifies the removable electronic strap via the unique identifier; and
the processor applies the setting to an output of the display.

9. The HMD system of claim 7, wherein the carrying case is configured to carry the HMD.

10. The HMD system of claim 7, wherein the antenna is configured to send an electromagnetic signal to an external speaker directing the external speaker to operate in conjunction with the display portion.

11. The HMD system of claim 6, wherein:
the removable electronic strap communicates with the display portion when the removable electronic strap is in the folded configuration directing the display portion to enter a power saving mode.

12. The HMD system of claim 6, wherein the removable electronic strap communicates with the display portion directing the display portion to exit a power saving mode when the removable electronic strap detects an approaching object.

13. The HMD system of claim 6, wherein:
the unique identifier comprises a visual image; and
the sensor comprises an optical sensor configured to detect the visual image.

14. The HMD system of claim 13, wherein the visual image includes a QR code or a bar code.

15. A modular securement assembly, comprising:
a connector strap including an antenna;
a first connection feature configured to removably connect the connector strap to a display;
a retention band; and
a second connection feature configured to removably connect the connector strap to the retention band;
wherein the antenna sends an electromagnetic signal to at least one of a head mountable device or a carrying case; and
wherein the electromagnetic signal comprises data indicating a position of the connector strap, wherein the position of the connector strap includes a folded configuration.

16. The modular securement assembly of claim 15, wherein the electromagnetic signal comprises a unique identifier.

17. The modular securement assembly of claim 16, wherein the first connection feature comprises an electrical connection.

18. The modular securement assembly of claim 15, wherein the electromagnetic signal comprises a setting.

19. The modular securement assembly of claim 15, wherein the electromagnetic signal comprises data indicating a power level of the display.

\* \* \* \* \*